United States Patent Office 3,767,602
Patented Oct. 23, 1973

3,767,602
SHELF-STABLE POLYURETHANE CATALYST MIXTURE AND METHOD OF PREPARING CELLULAR POLYURETHANES USING SAID MIXTURE
Felix P. Carroll, Chester, Pa., and John R. Panchak, Wilmington, Del., assignors to Air Products and Chemicals, Inc., Wayne, Pa.
No Drawing. Filed Oct. 30, 1972, Ser. No. 301,828
Int. Cl. C08g 22/44, 22/36, 22/42
U.S. Cl. 260—2.5 AC                                   8 Claims

ABSTRACT OF THE DISCLOSURE

Dibutyl tin diacetate, when combined in an amount of from 3% to 50% by weight with about 97% to about 50% by weight of the formate or acetate salt of an amine polyurethane catalyst provides a composition having an unexpectedly long shelf-stability. The tin catalyst and amine catalyst can be premixed in the desired proportions and stored. At a later time, the desired amount of the mixture can be introduced into the urethane precursor system to very effectively transform the precursor into a satisfactory polyurethane cellular product.

CROSS REFERENCE TO RELATED APPLICATIONS

Reference is made to Ser. No. 842,692 filed July 17, 1969, now abandoned, and to Ser. No. 155,226 filed June 21, 1971, now Pat. No. 3,728,291. All of the disclosure of said two applications is deemed here reiterated.

BACKGROUND OF INVENTION

(1) Field of invention

This invention relates to cellular polyurethane compositions and more particularly to compositions comprising a mixture of catalyst for use for promoting formation of rigid and high resiliency foams.

(2) Prior art

The reaction of an isocyanato group with hydroxyl groups can proceed at a significant rate because of the temperature of the reaction medium but can be accelerated by the presence of an appropriate catalyst. Similarly, the reaction between the isocyanato group and water for the generation of carbon dioxide blowing agent can be accelerated by the presence of a suitable catalyst.

The order of activity of numerous catalysts has been studied in simple systems, but such data has proven to be of little value in predicting the degree of suitability of a specific composition as a catalyst for the transformation of a precursor into a polyurethane foam under industrial conditions. Amine catalysts have been found to be highly advantageous for promoting polyurethane polymerization. Similarly, tin compounds have been found to have certain advantages in such catalyzation. During recent decades a significant portion of the total amount of the cellular polyurethane product has resulted from some combination of a tin compound and an amine compound for catalyzing of the precursor; see Polyurethanes: Chemistry and Technology; vol. I; Saunders and Frisch; Interscience Publishers; N.Y., 1962, pages 165 and 227 to 232. It has been the general practice to pump the solution comprising the tin compound separately from the solution containing the tertiary amine. It has been necessary to maintain such a separation of the two solutions until they are combined in the reaction zone for the polymerization because of the propensity of the amine catalyst to promote the decomposition of the tin catalyst. The design for mixing machines for polyurethane production has been significantly complicated by reason of the necessity of maintaining this separation of the tin compound from the amine compound.

SUMMARY OF THE INVENTION

In accordance with the present invention, there is the unobvious and surprising discovery that dibutyl tin diacetate can be preserved as a minor component in a mixture consisting predominantly of an amine salt, the salt being either a formate or an acetate, and the tertiary amine preferably being a heterocyclic diamine, that is either triethylenediamine or 2-methyl-1,4-diazabicyclo-(2,2,2)-octane (methyltriethylenediamine). The dibutyl tin diacetate is present in this mixture in an amount of about 3% to about 50% by weight. The high basicity, which apparently accounts for a part of the destructive propensity of the amine, and which has thus prevented the advance mixing of amine catalyst and tin catalyst, is avoided by reason of the near neutrality of the formate or acetate of the suitable tertiary amine. Although triethylenediamine and methyltriethylenediamine are preferred examples of the amine catalyst, certain other effective catalysts to be included in the group of operable amine catalyst are dimethylaminoethyl morpholine, bis-(dimethylaminoethyl)ether; hydroxypropylimidazole, tetramethyl guanadine, tetramethylbutylenediamine and mixtures thereof.

The catalyst mixture is united with a precursor comprising a polyol, a polyisocyanate, a blowing agent and a foam stabilizer in a suitable mixing device to produce either a rigid or resilient foam by techniques well known in the art.

The polyol may be polyethylene glycol, polypropylene glycol, a linear polyester such as glycolterephthalate, glycolsuccinate, tetramethyleneglycol adipate or other hydroxy terminated linear ester. Also the polyol may be glycerol, a polyethylene ether derivative of glycerol, erythritol, pentaerythritol, mannitol, sorbitol, $\alpha$-methyl glucoside and sucrose. The polyol may be a polyoxyalkaline polyol derived from a polyamine such as ethylenediamine or a polyalkaline oxide derivative of a starch. Mixtures of the polyols are satisfactory.

The polyisocyanate may be a tolylene diisocyanate. It is generally advantageous to employ an undistilled mixture of a technical grade of TDI. Any of the other conventionally employed polyisocyanates such as diisocyanatodiphenylmethane, condensation products providing a plurality of phenyl groups and a plurality of isocyanato groups, hexamethylenediisocyanate, chlorophenyldiisocyanate, bromophenyldiisocyanate, tetraisocyanatodiphenylmethane, and the like may be used.

The blowing agent may be water and/or a volatilizable organic agent such as dichlorodifluoromethane-Freon 12; dichlorofluoromethane; trichloromonofluoromethane; 1,1-dichloro-1-fluoroethane; 1-chloro-1,1-difluoro-2,2-dichloroethane; 1,1,1-trifluorobutane; 2-chloro-2-fluorobutane; 3,3-difluorobutane; 4,4,4-trifluorobutane; 1,1-difluoroethane; $C_4F_8$ cyclic-Freon C–318; dichlorotetrafluoroethane-Freon 114; trichlorotrifluoroethane-Freon 113; methylene chloride; carbon tetrachloride; butanes; pentanes; heptanes; and the like. Any suitable blowing agent may be employed in the precursor.

The foam stabilizer or surfactant may be any compound effective in favoring the retention of the gas generated during the reaction of the precursor, whereby relatively small cell size is attained as distinguished from the evolution of the very large cells. The surfactants may be of the silicone type, such as silicone block polymers comprising polyalkyleneglycol units.

In certain early work on polyurethane preparation, sodium hydroxide and potassium hydroxide were employed as catalysts, leading to the expectancy that a high pH should be a significant factor in the catalyzation of the precursor. In the development of the present invention, it was found surprisingly that the pH of the composition was not a significant factor in the series of tests conducted.

Tin compounds such as dibutyl tin diacetate can be decomposed by acid, and there has been the expectancy that any acidic or acid containing composition would trend to bring about the decomposition of the tin compound, whereby its effectiveneess as a catalyst would be essentially lost. Surprisingly it was found as described in the examples below that the presence of the appropriate salt of the appropriate acid did not promote any decomposition of the dibutyl tin diacetate. In the range of conditions investigated, either the formic acid or the acetic acid salt of the amine had catalytic effectiveness, on a per mole basis, substantially the same as that of the amine per se, indicating that the acid component did not significantly inhibit the catalytic action of the tertiary amine.

It is a significant advantage that at room temperature or at least at a temperature not significantly above room temperature, the blend of dibutyl tin diacetate and the formic acids and acetic acid salts of the appropriate tertiary amines are flowable as a liquid so that they can easily be pumped.

EXAMPLES 1–8

Experimental rigid polyurethane foams were prepared using various catalysts. Each sample was prepared using a precursor containing:

| | Amount, grams |
|---|---|
| Selectrofoam 6406 [1] | 109 |
| Silicone surfactant DC–193 [2] | 1.5 |
| Trichloromonofluoromethane | 47 |
| Hylene TIC [3] | 105 |

[1] Selectofoam 6406 is a mixture of a polypropylene oxide propanol derivative of sucrose, and an alkylene oxide derivative of ethylenediamine having a molecular weight of about 800; see U.S. Pat. No. 3,153,002, assigned to PPG Co.
[2] DC–193 surfactants comprise polysiloxane polyoxyalkylene block copolymers such as those described in U.S. Pat. Nos. 2,834,748 and 2,917,480 assigned to Union Carbide Corp.
[3] Hylene TIC is a technical grade of tolylene diisocyanate (TDI).

The precursor and selected catalyst were subjected to a standard hand mix procedure for preparation of a rigid foam. Measurements were taken during the procedure of the cream time, gel time, rise time and tackfree time. In most cases, the pH of the precursor containing the catalyst prior to the measuremeent of the cream were evaluated to note the relative alkalinity or acidity as expressed as a pH.

Tables I, II, III, and IV indicate the amount of catalyst compositions of the examples containing 5 wt. percent dibutyl tin diacetate and the control catalysts that did not contain a tin component and compare the results obtained therefrom. The superior performance of the catalyst compositions of this invention was obtained without regard to which of the several types of tertiary amine catalyst were employed. As indicated in Tables I, II, III, and IV, the data provides a basis for evaluating whether satisfactory catalytic results are attainable. It should be noted that the data relating to the performance of the catalyst compositions of Examples 1–8 comprising 5 wt. percent of the dibutyl tin diacetate and 95 wt. percent of the salt of the amine were essentially the same whether the amine was of the formate or acetate type. Controls A–P demonstrated that the performance using the acid salt resembled the results using the free amine.

TABLE I

| | Control A | Control B | Ex. 1 | Control C | Control D | Ex. 2 |
|---|---|---|---|---|---|---|
| Catalyst, grams: | | | | | | |
| TEDA [1] | 0.2 | | | | | |
| TEDA·DF [2] | | 0.33 | | | | |
| Sn+TEDA·DF [3] | | | 0.35 | | | |
| M·TEDA [4] | | | | 0.2 | | |
| M·TEDA·DF [5] | | | | | 0.28 | |
| Sn·M·TEDA·DF [6] | | | | | | 0.31 |
| Results: | | | | | | |
| Cream time, sec | 12 | 7 | 11 | 16 | 11 | 13 |
| Gel time, sec | 48 | 45 | 53 | 60 | 64 | 48 |
| Rise time, sec | 150 | 120 | 90 | 165 | 180 | 120 |
| Tack-free time, sec | 155 | 130 | 103 | 190 | 195 | 140 |
| pH | 10.9 | 6.2 | 6.0 | 14 | 5.9 | 5.95 |

[1] Triethylenediamine.
[2] Triethylenediamine diformate.
[3] Dibutyl tin diacetate plus TEDA·DF.
[4] Methyltriethylenediamine.
[5] Methyltriethylenediamine diformate.
[6] Dibutyl tin diacetate plus M·TEDA·DF.

TABLE II

| | Control E | Control F | Ex. 3 | Control G | Control H | Ex. 4 |
|---|---|---|---|---|---|---|
| Catalyst, grams: | | | | | | |
| Niax® A-1 [1] | 0.6 | | | | | |
| Niax® A-1·DF [2] | | 0.99 | | | | |
| Sn·Niax® A-1·DF [3] | | | 1.08 | | | |
| TMG [4] | | | | 0.6 | | |
| TMG·F [5] | | | | | 0.72 | |
| Sn TMG·F [6] | | | | | | 0.81 |
| Results: | | | | | | |
| Cream time, sec | 15 | 9 | 8 | 11 | 11 | 8 |
| Gel time, sec | 70 | 55 | 34 | 45 | 52 | 35 |
| Rise time, sec | 194 | 180 | 65 | 118 | 150 | 68 |
| Tack-free time, sec | 215 | 195 | 75 | 130 | 167 | 75 |
| pH | 11.9 | 7.1 | 6.99 | 14 | | |

[1] Niax® A-1 is a blend of bis (dimethylaminoethyl) ether and dipropylene glycol; see U. S. Patent No. 3,330,782.
[2] Niax® A-1·DF is a blend of bis (dimethylaminoethyl) ether diformate and dipropylene glycol.
[3] Dibutyl tin diacetate plus Niax® A-1·DF.
[4] Tetramethylguanidine.
[5] Tetramethylguanidine formate.
[6] Dibutyl tin diacetate plus TMG·F.

TABLE III

| | Control J | Control K | Ex. 5 | Control L | Control M | Ex. 6 |
|---|---|---|---|---|---|---|
| Catalyst, grams: | | | | | | |
| TMBDA [1] | 0.6 | | | | | |
| TMBDA·DF [2] | | 0.81 | | | | |
| Sn·TMBDA·DF [3] | | | 0.90 | | | |
| DMAEM [4] | | | | 0.6 | | |
| DMAEM·DF [5] | | | | | 0.83 | |
| Sn·DMAEM·DF [6] | | | | | | 0.87 |
| Results: | | | | | | |
| Cream time, sec | 10 | 11 | 8 | 10 | 24 | 9 |
| Gel time, sec | 60 | 70 | 30 | 60 | 161 | 44 |
| Rise time, sec | 160 | 180 | 60 | 160 | 300+ | 70 |
| Tack-free time, sec | 180 | 195 | 63 | 180 | | 80 |
| pH | 14 | 7.7 | 7.57 | 14 | 12 | 5.95 |

[1] Tetramethylbutanediamine.
[2] Tetramethylbutanediamine diformate.
[3] Dibutyl tin diacetate plus TMBDA·DF.
[4] Dimethylaminoethyl morpholine.
[5] Dimethylaminoethyl morpholine diformate.
[6] Dibutyl tin diacetate plus DMAEM·DF.

TABLE IV

| | Control N | Example 7 | Control P | Example 8 |
|---|---|---|---|---|
| Catalyst, grams: | | | | |
| TEDA·DA [1] | 0.28 | | | |
| Sn·TEDA·DA [2] | | 0.31 | | |
| MTEDA·DA [3] | | | 0.41 | |
| Sn·MTEDA·DA [4] | | | | 0.45 |
| Results: | | | | |
| Cream time, sec | 12 | 6 | 13 | 11 |
| Gel time, sec | 53 | 35 | 57 | 38 |
| Rise time, sec | 105 | 78 | 152 | 95 |
| Tack-free time, sec | 170 | 95 | 210 | 120 |

[1] Triethylenediamine diacetate.
[2] Dibutyl tin diacetate plus TEDA·DA.
[3] Methyltriethylenediamine diacetate.
[4] Dibutyl tin diacetate plus MTEDA·DA.

Particular attention is directed to the fact that each of the formate and acetate compositions containing the dibutyl tin diacetate has significant shelf stability, permitting the composition containing both the amine salt and tin compound to be stored over a period of months without deterioration of the catalytic activity of the composition. This compatibility permits factory mixing and factory proportioning and thereby eliminates the need for separate measuring devices controlling the proportion of amine and tin catalyst in the plant at which the catalyst is used.

EXAMPLES 15–19

As shown in Table VII and Examples 15–19, the tests show that a catalyst mixture comprising 5 wt. percent of dibutyl tin diacetate and 95 wt. percent of a mixture of 73% triethylenediamine diformate and 23% 1-hydroxypropylimidazole to achieve a plurality of results within the range of commercially satisfactory results. The combination of the tin component and triethylenediamine diformate has a synergistic effect, as evidenced by the superiority of results over controls R, S, and T without the tin component.

|  | Control | | | Example | | | | |
|---|---|---|---|---|---|---|---|---|
|  | R | S | T | 15 | 16 | 17 | 18 | 19 |
| Amount of catalyst, g | 0.2 | 0.6 | 1.0 | 0.2 | 0.4 | 0.6 | 0.8 | 1.0 |
| Results: | | | | | | | | |
| Cream time, sec | 24 | 19 | 11 | 20 | 18 | 16 | 14 | 11 |
| Gel time, sec | 152 | 77 | 52 | 120 | 71 | 5 | 42 | 34 |
| Rise time, sec | 179 | 130 | 110 | 177 | 121 | 82 | 74 | 67 |
| Tack-free time, sec | 310 | 167 | 110 | 310 | 175 | 101 | 86 | 67 |

EXAMPLES 9–13

A series of rigid polyurethane foam samples were prepared from the same precursor as in Examples 1–8, but utilizing a mixture of triethylenediamine and hydroxypropylimidazole as the catalyst composition to be converted to the diformate salt and thereafter modified by the addition of from 5% to 33% by weight of dibutyl tin diacetate in the catalyst mixture. In each of Examples 9–13, a mixture of 73% triethylenediamine diformate salt in 27% 1-hydroxypropylimidazole was employed and variations were made in the percentage of dibutyl tin diacetate, $Bu_2Sn(OAc)_2$, in the catalyst composition. As shown in Table V, in Examples 9, 10, 11, 12 and 13, the dibutyl tin diacetate amount in the catalyst compositions were 5, 10, 15, 20 and 33% by weight, respectively. The results set forth in Table V were satisfactory throughout the 5 to 33% range of the tin catalyst concentration.

TABLE V

|  | Example | | | | |
|---|---|---|---|---|---|
|  | 9 | 10 | 11 | 12 | 13 |
| Amount of catalyst, g | 0.2 | 0.2 | 0.2 | 0.2 | 0.2 |
| Percent $Bu_2Sn(OAc)_2$ in catalyst | 5 | 10 | 15 | 20 | 33 |
| Results: | | | | | |
| Cream time, sec | 21 | 22 | 21 | 18 | 15 |
| Gel time, sec | 110 | 85 | 80 | 67 | 40 |
| Rise time, sec | 160 | 140 | 135 | 105 | 85 |
| Tack-free time, sec | 194 | 167 | 135 | 110 | 90 |

EXAMPLE 14

The utility of a rigid polyurethane foam board is influenced by its insulation value expressed as an original $k$ factor and dimensional stability. Data relating to certain preparations of rigid foams using the 5% dibutyl tin diacetate and 95% of the mixture of 27% 1-hydroxypropylimidazole and 73% triethylenediamine diformate and a control (Q) without the tin component are shown in Table VI below. The results indicate that the composition of this invention has excellent insulation value and dimensional stability.

TABLE VI

|  | Control Q | Example 14 |
|---|---|---|
| Amount of catalyst, g | 0.3 | 0.3 |
| Results: | | |
| Cream time, sec | 9 | 9 |
| Gel time, sec | 45 | 38 |
| Rise time, sec | 75 | 65 |
| Tack-free time, sec | | 70 |
| Percent open cells | 9.7 | 9.5 |
| Cells per inch | 61 | 70 |
| Pounds per cubic foot | 1.78 | 1.47 |
| Compressive strength at yield, p.s.i. | 21 | 22 |
| $k$ Factor, original | 0.131 | 0.141 |
| Dimensional stability (158 F., 100% RH) after: | | |
| 1 day | +9.3 | +4.3 |
| 7 days | +10 | +6.8 |

EXAMPLES 20–22

Experimental high resilient, flexible urethane slabstock foams were prepared employing a catalyst blend of 5 wt. percent of dibutyl tin diacetate and 95 wt. percent of a mixture of 73 parts TEDA·DF and 27 parts of 1 molar hydroxypropyl imidazole at various concentrations. Each example was prepared using a precursor containing:

|  | Amount, grams |
|---|---|
| HR–5000 polyol [1] | 100.0 |
| LD–813 cross-linking agent [2] | 5.0 |
| F1–1630 silicone [3] | 0.035 |
| Water | 2.4 |
| TDI [4] 105 Index | 33.0 |

[1] HR–5000 polyol represents a class of polyols within a molecular weight range of 4000–7000 based on glycerine, propylene oxide and tipped with ethylene oxide and is manufactured by Dow Chemical Company.
[2] A mixture of 40 wt. percent 4,4′-methylene-bis-orthochloroaniline and 60 wt. percent of mixed arylene diamines; see U.S. Pat. No. 3,393,239 assigned to E. I. du Pont de Nemours.
[3] A low molecular weight silicone oil manufactured by Dow Corning Company.
[4] Fifty parts of 65 wt. percent 2,4-TDI isomer and 35% 2,6-TDI isomer plus 50 parts of 80 wt. percent 2,4-TDI isomer and 20% 2,6-TDI isomer.

The precursor and the desired amount of the catalyst blend were subjected to the standard hand mix procedure for preparation of a resilient foam. Measurements were taken during the procedure of the cream time, gel time and rise time. In addition, a complete determination of the physical properties of each of the resulting slabstock foam products was made and is reported in Table VIII below.

TABLE VIII

|  | Example | | |
|---|---|---|---|
|  | 20 | 21 | 22 |
| Amount of catalyst, g | 0.35 | 0.6 | 0.4 |
| Results: | | | |
| Activity, seconds: | | | |
| Cream | 7 | 5–7 | 6–8 |
| Hard gel | 119 | 85–90 | 85–90 |
| Rise | 135 | 105–107 | 115 |
| Density, lbs./ft.³ | 2.22 | 2.31 | 2.44 |
| Tensile strength, lbs./in.² | 18.3 | 21.4 | 18.5 |
| Elongation, percent | 210 | 255 | 250 |
| Tear strength, lbs./in | 2.10 | 2.13 | 2.20 |
| Compression set (75% deflection) | 8.20 / 7.30 | 6.92 / 8.34 | 8.22 / 7.71 |
| Compression set (50% deflection) after 5 hours stream autoclave | 25.0 / 28.6 | 26.6 / 27.6 | 29.3 / 33.3 |
| Indentation load deflection at: | | | |
| 25% deflection | 21.7 | 27.7 | 28.3 |
| 65% deflection | 54.5 | 69.1 | 70.5 |
| 25 deflection (return) | 16.5 | 21.2 | 21.8 |
| Modulus (SAG) | 2.5 | 2.5 | 2.49 |
| Resilience (ball reload percent) | 46 | 45.3 | 45.0 |
| Percent hysteresis loss | 13.2 | 13.1 | 12.95 |
| Guide factor | 7.6 | 7.65 | 7.7 |
| Cells/linear inch | 46.3 | 49.0 | 50.0 |
| Porosity air flow, c.f.m | 2.93 | 1.98 | 1.98 |

The foregoing high resilient foam products have been found to compare favorably in every aspect of the physical properties reported in Table VIII above to high resilient foam products prepared by a commercially available standard urethane catalyst blend such as catalyst blend of 0.18 part by weight of Niax® A-1 (see U.S. Pat. No. 3,330,782), 0.2 part by weight of DABCO® 33LV (a mixture of 33 wt. percent TEDA and 67 wt. percent dipropylene glycol) and 1 part of n-ethyl morpholine for a total weight of 1.38 grams. The amount of the commercial catalyst blend used was about 230% to 400% greater than the amount of the catalyst composition of the present invention that was required to produce approximately the same foam product. This result indicates the processing and economic advantage of the claimed catalyst blend.

It has been established by a series of tests that unlike other tin compounds such as dibutyl tin dilaurate; dibutyl tin diacetate is completely compatible with an acetic acid or formic acid salt of one of the foregoing tertiary amines to form a completely homogeneous, miscible liquid. It has also been found by a series of tests that the resulting liquid mixture is a highly active catalyst for the production of polyurethane foams and has a unique shelf stability for prolonged storage.

Emulsifiers, stabilizers, protective colloids, thickening agents, fillers, pigments, plasticizers and the like can be added to the polyurethane catalyst composition of this invention. In addition, various other modifications can be made to the invention where appropriate without departing from the spirit and scope of the appended claims.

The invention claimed is:

1. In the method of preparing cellular polyurethane plastic by the reaction of a precursor comprising a polyol having at least two alkanol groups per molecule, an organic polyisocyanate compound containing at least two isocyanato groups per molecule, a volatilizable blowing agent, and a catalyst, the improvement which comprises employing as the catalyst for said reaction, the combination of:
   a catalytic amount of a monocarboxylic organic acid salt of a tertiary amine, said organic acid being selected from the group consisting of acetic acid and formic acid, and said tertiary amine being selected from the group consisting of triethylenediamine, 2-methyl - 1 - 4 - diazabicyclo - (2,2,2) - octane, dimethylaminoethyl morpholine, bis (dimethylaminoethyl) ether, hydroxypropylimidazole, tetramethyl guanidine, tetramethylbutane diamine, and mixtures thereof; and
   an amount of dibutyl tin diacetate constituting from about 3% to about 50% by weight of said mixture, said mixture of said amine salt and dibutyl tin diacetate having stability for prolonged storage as a mixture.

2. The method of claim 1 in which the reaction mixture contains a surfactant.

3. The method of claim 1 in which a heterocyclic diazine is employed as the tertiary amine catalyst.

4. The method of claim 3 in which the polyol contains at least 3 hydroxy groups per molecule and the plastic is a rigid foam.

5. The method of claim 3 in which the plastic is a highly resilient foam.

6. A polyurethane catalyst composition for the polymerization of a polyol and an organic polyisocyanate which comprises:
   a catalytic amount of a monocarboxylic organic acid salt of a tertiary amine, said organic acid being selected from the group consisting of acetic acid and formic acid, and said tertiary amine being selected from the group consisting of triethylenediamine, 2-methyl - 1 - 4 - diazabicyclo - (2,2,2) - octane, dimethylaminoethyl morpholine, bis (dimethylaminoethyl) ether, hydroxypropylimidazole, tetramethyl guanidine, tetramethylbutane diamine, and mixtures thereof; and
   an amount of dibutyl tin diacetate, constituting from about 3% to about 50% by weight of said mixture, said mixture of said amine salt and dibutyl tin diacetate having stability for prolonged storage as a mixture.

7. The catalyst composition in accordance with claim 6 in which a heterocyclic diazine is employed as the tertiary amine catalyst.

8. The catalyst composition in accordance with claim 6 in which the tertiary amine catalyst comprises a mixture of said salt of triethylenediamine and hydroxypropyl imidazole in a catalytic amount by weight not greater than the amount of said triethylenediamine salt.

References Cited
UNITED STATES PATENTS

| | | | |
|---|---|---|---|
| 3,645,924 | 2/1972 | Fogiel | 260—2.5 AC |
| 3,448,065 | 6/1969 | Green | 260—2.5 AC |
| 3,330,782 | 7/1967 | Poppelsdorf | 260—2.5 AC |
| 3,167,555 | 1/1965 | Farkas | 260—2.5 AC |
| 3,010,963 | 11/1961 | Erner | 252—426 |
| 2,842,506 | 7/1958 | Roussel | 260—2.5 AC |

FOREIGN PATENTS

| | | | |
|---|---|---|---|
| 794,051 | 4/1958 | Great Britain | 260—2.5 AC |
| 839,185 | 6/1960 | Great Britain | 260—2.5 AC |
| 651,638 | 11/1962 | Canada | 260—2.5 AC |

DONALD E. CZAJA, Primary Examiner

C. W. IVY, Assistant Examiner

U.S. Cl. X.R.

252—431 N, 431 C